United States Patent [19]
Dobie

[11] 3,746,961
[45] July 17, 1973

[54] BATTERY CHARGING CIRCUIT

[75] Inventor: Alexander Barbour Dobie, Newcastle upon Tyne, England

[73] Assignee: Ronson Corporation, Woodbridge, N.J.

[22] Filed: Sept. 14, 1972

[21] Appl. No.: 289,181

[30] Foreign Application Priority Data
Sept. 24, 1971 Great Britain.................. 44,740/71

[52] U.S. Cl..................................... 320/48, 320/2
[51] Int. Cl. ........................................... H01m 45/06
[58] Field of Search ....................... 320/2, 3, 4, 48, 320/DIG. 2

[56] References Cited
UNITED STATES PATENTS
2,898,539   8/1959   Lozeau ............................. 320/48
3,539,898   10/1970   Tolmie .................................. 320/2

Primary Examiner—J. D. Miller
Assistant Examiner—Robert J. Hickey
Attorney—Lewis H. Eslinger

[57] ABSTRACT

A battery charger for recharging a rechargeable battery cell wherein an indication is given as to whether charging current is being drawn. In the charging circuit a capacitor and a rectifying arrangement are connected in series across an ac source and a neon tube and capacitor are connected across the capacitor. With this arrangement the neon tube is illuminated when a charging current is drawn and is not illuminated at other times.

8 Claims, 4 Drawing Figures

BATTERY CHARGING CIRCUIT

The present invention relates to a battery charger and more particularly to a battery charging circuit for charging one or more rechargeable cells from a main AC supply. Typical application for the invention is found in charging circuits for rechargeable electric shavers, tooth brushes and the like.

An object of the present invention is to provide a battery charger in which an indication is given according to whether or not charging current is being drawn.

It is a further object of the present invention to provide a battery charging circuit which utilizes a neon tube to provide an indication as to whether or not a charging current is being drawn.

According to one embodiment of the present invention there is provided a battery charging circuit comprising terminals for an AC main supply; a capacitor and a rectifying arrangement connected in series across the AC main supply terminals; DC output terminals connected to the rectifying arrangement for supplying a battery to be charged; and, connected across the capacitor, a series combination of a second capacitor and neon tube.

The battery charging circuit of the present invention is of a kind in which the charging current is limited by a capacitor. Preferably a resistor is connected across the capacitor to discharge the capacitor when the circuit is switched off.

With the arrangement described above the passage of charging current between the DC output terminals requires an alternating current to pass through the first mentioned capacitor. When no charging current is being drawn from the DC output terminals then the current through the first mentioned capacitor is negligible. Depending on the particular rectifier arrangement chosen, the corresponding voltage across the first mentioned capacitor when no charging current is being drawn is either negligible or is a direct voltage. The second capacitor in series with the neon tube serves to limit the neon tube current when the tube strikes and may also serve to constitute a voltage blocking device which prevents a striking voltage appearing across the neon tube when the voltage across the first capacitor is a direct voltage.

Thus, it will be seen that the above described arrangement can ensure that the neon tube is illuminated when a charging current is drawn from the DC output terminals and is not illuminated at other times.

The rectifier arrangement may be a half-wave rectifier or a full-wave rectifier. The preferred arrangement for a half-wave rectifier is to use two diodes, a first in series with the DC output terminals and a second across the series combination of the first diode and the DC output terminals. With this arrangement a direct voltage is generated across the first mentioned capacitor when no charging current is being drawn. This direct voltage does not cause the neon tube to strike but it may be used in a modified form of the circuit to cause intermittent firing of the tube, thus giving a second kind of indication. A direct voltage for this purpose may alternatively be derived from a full-wave bridge rectifier by providing a leakage resistor across one of the diodes thereof.

In accordance with the modification mentioned above, a third capacitor is provided in series with a charging resistor across the first mentioned capacitor, and thus across the series combination of the second capacitor and the neon tube. The junction of the third capacitor and the charging resistor is joined to the junction of the second capacitor and the neon tube. The neon tube thereby constitutes part of a relaxation oscillator which, if a direct voltage is maintained across the first mentioned capacitor, fires the tube intermittently. The firing rate of the tube may be adjusted by adjustment of the component values of the relaxation oscillator circuit.

The invention will be further described with reference to the accompanying drawings, of which:

Figure 1:
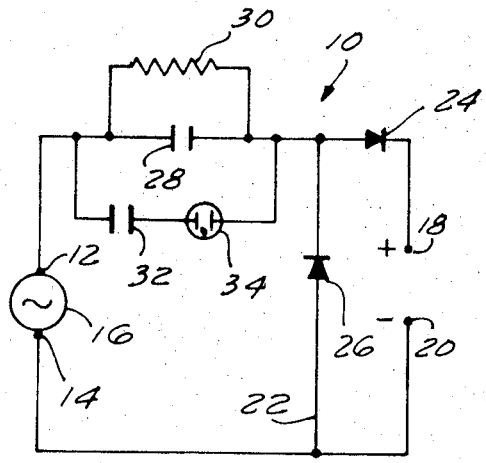
FIG. 1 is a circuit diagram of a battery charging circuit in accordance with one embodiment of the invention.

Referring to FIG. 1 the charging circuit 10 of the present invention comprises terminals 12 and 14 across an AC main supply 16 which may typically be 120 volts at 60 Hz. The battery or cell to be charged is connected between output terminals 18 and 20 which are connected via a half-wave rectifying arrangement 22 having diodes 24 and 26, and a current limiting capacitor 28 to the supply terminals 12 and 14. A high value discharge resistor 30 is connected across capacitor 28 to discharge the capacitor when the circuit is switched off. Also connected across capacitor 28 is a series combination of a second capacitor 32 and a discharge illumination tube such as a neon tube 34.

The circuit of FIG. 1 operates in the following manner. If a battery or rechargeable cell is connected between terminals 18 and 20, charging current is supplied thereto during positive half cycles of the main AC supply through capacitor 28 and diode 24. Capacitor 28 presents a high impedance to the supply frequency current and limits the charging current supplied to the battery or cell to the appropriate value. During negative half cycles the diode 26 conducts and capacitor 28 is charged in the reverse direction. Therefore, with a battery connected between terminals 18 and 20, the current through capacitor 28 alternates and the voltage across the capacitor is an alternating voltage. Because of this, an alternating current is passed through the series combination of capacitor 32 and the tube 34 and the tube strikes, thereby being illuminated. The tube 34 is visible to the user and thus when it is illuminated gives an indication that the battery is being charged.

When the battery draws no charging current because it is absent there is no conduction through capacitor 28 during the positive half cycles and the effect of diode 26 is therefore to charge the capacitor 28 with a unidirectional voltage. The minor ripple fluctuations of this unidirectional voltage are insufficient to cause adequate current to pass through capacitor 28 to illuminate the tube 34. Therefore, when no charging current is being drawn the tube is not illuminated.

Figure 2:
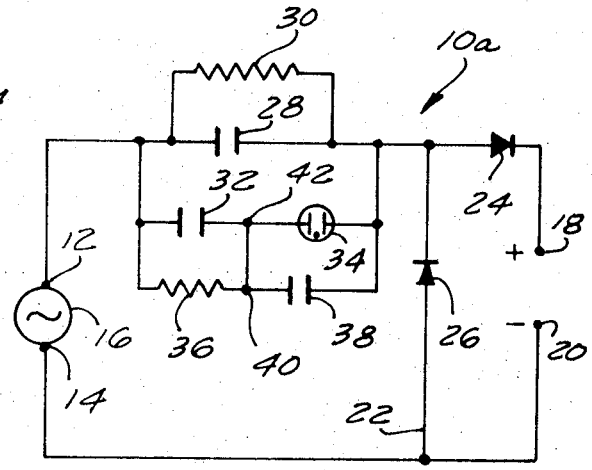
FIG. 2 is a circuit diagram of a battery charging circuit in accordance with another embodiment of the invention.

It will be appreciated that the reason for no charging current being drawn may be that the main supply is switched off or not connected rather than because the battery is not connected. It is possible to derive from tube 34 an indication which differentiates between these two conditions. This is achieved by an alternate embodiment as shown in FIG. 2 of the drawings. The circuit 10a of FIG. 2 is similar to that of FIG. 1, with like elements shown with the same numeral designation, except that across the series combination of capacitor 32 and tube 34 there is connected a series combination of a resistor 36 and a third capacitor 38. The junction 40 of resistor 36 and capacitor 38 is connected to the juncture 42 of capacitor 32 and tube 34. This arrangement constitutes a relaxation oscillator which, when there is a unidirectional voltage established across capacitor 28, causes the tube 34 to flash periodically. It will be seen that this condition exists if there is no battery connected between terminals 18 and 20 but if the main supply 16 is connected in the circuit. Thus, with the FIG. 2 arrangement there are three charging indications from the same lamp, namely:

a. a continuously illuminated tube 34 showing that the battery is taking charge;

b. a flashing tube 34 showing that no charging current is being drawn but that the main supply is connected in the circuit; and c. the tube 34 is off showing that the main supply is not connected in the circuit.

Figure 3:
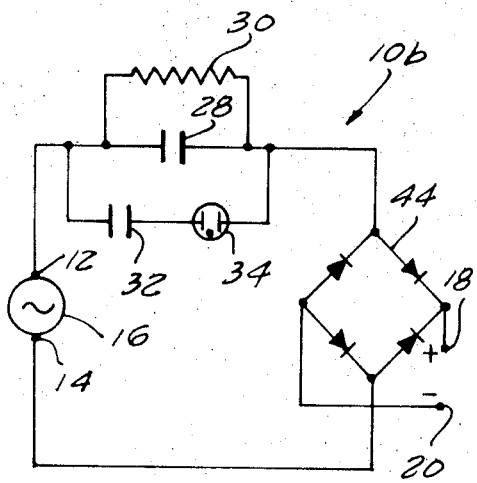
FIG. 3 is a circuit diagram of a battery charging circuit in accordance with the invention similar to that of FIG. 1 but with a full-wave rectifier.

FIG. 3 shows an alternate circuit arrangement 10b similar to FIG. 1 but in which there is a full-wave rectifier arrangement 44 in place of the half-wave rectifier arrangement 22 of FIG. 1. With the bridge full-wave rectifier arrangement 44 of FIG. 3 no unidirectional voltage is established across capacitor 28 when the battery to be recharged is absent. However, there are two indications given, as with the FIG. 1 arrangement, namely when the tube 34 is illuminated it shows that charging current is being drawn and when the tube 34 is not illuminated it shows that no charging current is being drawn.

Figure 4:
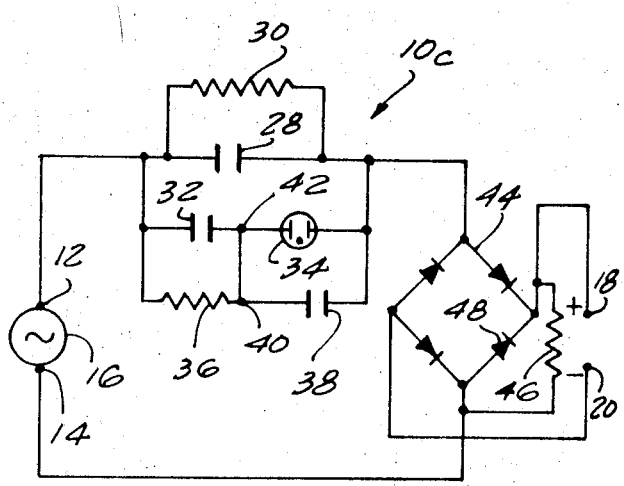
FIG. 4 is a circuit diagram of a battery charging circuit in accordance with another embodiment of the invention having a full-wave rectifier.

FIG. 4 shows an alternate circuit arrangement 10c of the circuit of FIG. 3 which allows the above described winking indication to be given with a full-wave rectifier arrangement. In FIG. 4 a leakage resistor 46 is provided across one of the diodes 48 of the bridge rectifier. This allows a unidirectional voltage to be established across capacitor 28 when the battery is absent. Thus, the provision of the additional capacitor 38 and resistor 36 as in the FIG. 2 circuit arrangement allows the circuit to cause tube 34 to give a winking indication if the battery is absent.

It is thus seen that the present invention provides a battery charging circuit in which a visible indication as to whether charging current is being drawn is given. In an alternate embodiment of the invention an indication is also given as to whether the AC power supply is connected into the circuit.

What is claimed is:

1. A battery charging circuit for charging a rechargeable battery cell comprising:

terminals for connection to an AC power supply, a first capacitor and a rectifying arrangement connected in series across said AC power supply terminals, DC output terminals connected across said rectifying arrangement for supplying direct current to a battery cell to be charged, and a series combination of a second capacitor and a discharge illuminating tube connected across said first capacitor whereby said rectifying arrangement impresses an alternating current across said second capacitor and said illumination tube when charging current to said battery cell is drawn thereby to illuminate said tube to provide a visible indication that charging of said cell is occurring.

2. A circuit as defined in claim 1 wherein said rectifier arrangement comprises a half-wave rectifier including two diodes, a first diode being connected in series with said DC output terminals and the second of said diodes connected across the series combination of the first diode and said DC output terminals.

3. A circuit as defined in claim 2 wherein a series combination of a resistor and a third capacitor are connected across the series combination of said second capacitor and said discharge illumination tube with the junction of said third capacitor and said resistor connected to the junction of said second capacitor and said tube to provide a relaxation oscillator arrangement which intermittently illuminates said tube when no charging current is drawn but when said circuit is connected to said AC supply.

4. A battery charging circuit as defined in claim 1 including a high value discharge resistor connected across said first capacitor to discharge said first capacitor when said circuit is switched off.

5. A circuit as defined in claim 1 wherein said rectifier arrangement comprises a full-wave rectifier including four diodes arranged as a bridge full-wave rectifier connected across said DC output terminals.

6. A circuit as defined in claim 5 wherein a series combination of a resistor and a third capacitor are connected across the series combination of said second capacitor and said discharge illumination tube with the junction of said third capacitor and said resistor connected to the junction of said second capacitor and said tube to provide a relaxation oscillator arrangement and a second resistor connected across one of the diodes of said full-wave rectifier bridge to provide a leakage resistor whereby said illumination tube intermittently illuminates when no charging current is drawn but when said circuit is connected to said AC supply.

7. A charging circuit as defined in claim 5 including a high value discharge resistor connected across said first capacitor to discharge said first capacitor when said circuit is switched off.

8. A charging circuit as defined in claim 1 wherein said discharge illumination tube is a neon tube.

* * * * *